United States Patent
Wang et al.

(10) Patent No.: US 10,907,761 B2
(45) Date of Patent: Feb. 2, 2021

(54) IN-SERVICE AND TRENCHLESS REPAIR METHOD FOR DISCONNECTION OF DRAINAGE PIPELINE

(71) Applicants: Infrastructure Renewal Institute of Southern China, Guangdong (CN); WELEAD Infrastructure Engineering Technology (Zhengzhou), Ltd.

(72) Inventors: Fuming Wang, Guangdong (CN); Hongyuan Fang, Guangdong (CN); Peng Zhao, Henan (CN); Yanhui Pan, Henan (CN); Bin Li, Henan (CN); Hang He, Henan (CN)

(73) Assignees: Infrastructure Renewal Institute of Southern California, Guangdong (CN); WELEAD Infrastructure Engineering Technology (Zhengzhou), Ltd., Henan (CN)

( * ) Notice: Subject to any disclaimer, the term of this patent is extended or adjusted under 35 U.S.C. 154(b) by 0 days.

(21) Appl. No.: 16/858,728

(22) Filed: Apr. 27, 2020

(65) Prior Publication Data
US 2020/0256499 A1 Aug. 13, 2020

(30) Foreign Application Priority Data
Sep. 25, 2019 (CN) .......................... 2019 1 0911302

(51) Int. Cl.
*F16L 55/175* (2006.01)
*F16L 55/165* (2006.01)
*F16L 55/30* (2006.01)
*G01N 29/04* (2006.01)
(Continued)

(52) U.S. Cl.
CPC ......... *F16L 55/175* (2013.01); *F16L 55/1654* (2013.01); *F16L 55/30* (2013.01); *G01N 29/04* (2013.01); *F16L 2101/30* (2013.01); *F16L 2101/60* (2013.01); *G01N 2291/0289* (2013.01); *G01N 2291/2636* (2013.01)

(58) Field of Classification Search
CPC .............................. F16L 55/175; F16L 55/168
USPC ..................... 138/97, 98; 73/40.5 R, 40.5 A; 405/184.1
See application file for complete search history.

(56) References Cited

U.S. PATENT DOCUMENTS 2,917,085 A * 12/1959 Douse ....................... E03F 3/06
138/97
2,971,259 A * 2/1961 Hahnau ................... G01M 3/38
33/1 H

FOREIGN PATENT DOCUMENTS

FR 2696811 A1 * 4/1994 .............. F16L 55/18

* cited by examiner

*Primary Examiner* — Sunil Singh (57) ABSTRACT

A in-service trenchless repair method for disconnection of a drainage pipe includes steps of: detecting the disconnection by a pipe sonar, and making a traction rope; pulling a hollowed cylindrical airbag to the disconnection according to the mark on the traction rope; controlling an airbag valve by an air compressor on the ground to inflate the hollowed cylindrical airbag, so that the hollowed cylindrical airbag is in close contact with pipeline wall after inflation; drilling a grouting hole on the ground surface directly above and on both sides of the disconnection until reaching the disconnection, and inserting a grouting pipe into the grouting hole; then injecting a double-slurry quick-curing repair material into the disconnection through a grouting system on the ground and waiting for curing; deflating the hollowed cylindrical airbag and pulling out by the traction rope.

16 Claims, 4 Drawing Sheets

(51) Int. Cl.
*F16L 101/30* (2006.01)
*F16L 101/60* (2006.01)

IN-SERVICE AND TRENCHLESS REPAIR METHOD FOR DISCONNECTION OF DRAINAGE PIPELINE

CROSS REFERENCE OF RELATED APPLICATION

The present invention claims priority under 35 U.S.C. 119(a-d) to CN 201910911302.7, filed Sep. 25, 2019.

BACKGROUND OF THE PRESENT INVENTION

Field of invention

The present invention relates to a technical field of underground drainage pipeline repair, and more particularly to an in-service and trenchless repair method for disconnection of an underground drainage pipeline.

Description of Related Arts

As the "underground aorta" of modern cities, urban underground drainage pipeline networks bear important responsibilities such as pollution discharge and water drainage, which play a pivotal role in the daily lives of urban residents. With the acceleration of China's urbanization process, construction scale of urban underground drainage pipeline networks is also increasing. As of 2017, length of urban drainage pipes in China has exceeded 630,000 km. However, with the continuous increase of service life, the pipelines are seriously aging and in disrepair, wherein diseases such as leakage, corrosion, misalignment and disconnection are common.

Disconnection is conventionally one of the most common diseases of underground drainage pipelines. If not treated in time, disconnection will lead to the leakage of sewage in the pipeline, which will finally hollow out the foundation of the pipeline, leading to new diseases such as void and misalignment as well as pollution of surrounding soil and underground water. In addition, if the underground water level around the pipeline is high, disconnection will also cause a large amount of underground fresh water to infiltrate into the pipeline, which seriously affects the treatment efficiency of the sewage plant.

The conventional repair methods for disconnection of pipelines are mainly divided into two categories. The first is excavation repair. Such repair has a slow construction speed, the traffic impact is large, the cost is high, a lot of construction waste is generated, and the environment is polluted. The second is trenchless repair. Main technologies thereof comprise pipeline penetration method, cured-in-place pipe (CIPP) method, pipe crushing method, winding method, local repair method, etc. Compared with conventional excavation repair, trenchless repair has faster construction speed, lower cost, smaller impact on the environment, etc.

Traditionally, a trenchless pipe point repair method based on a two-component repair resin (Chinese patent CN109854859A) disclosed a trenchless pipe point repair method, comprising winding and fixing a glass fiber composite felt infiltrated with resin on a repair airbag, and then sending the repair airbag to a damaged position, so that the resin on the repair airbag and the damaged position of a pipeline are cured and then the airbag pressure is released to achieve a purpose of repairing the damaged position. However, water should be stopped during repair, resulting in extremely large operating load for urban drainage main pipelines. Furthermore, when sending the repair airbag to the damaged position, the resin and other repair materials may detach, affecting repair efficiency and effect.

Therefore, there is an urgent need to develop a trenchless repair method for underground concrete drainage pipelines under in-service conditions.

SUMMARY OF THE PRESENT INVENTION

To overcome the above defects, the present invention provides an in-service and trenchless repair method for disconnection of drainage pipeline. Based on a fact that urban main drainage pipeline has a heavy operation load and water cannot be stopped for maintenance, the present invention first uses a hollowed cylindrical airbag to press and plug a disconnection position, then drills holes at ground surfaces directly above and on both sides of the disconnection position, and injects a new type of double-slurry quick-curing polymer repair material for external grouting point maintenance at the disconnection of the drainage pipeline, thereby rapidly repairing the disconnection of the drainage pipeline with water stop.

Accordingly, in order to accomplish the above objects, the present invention provides 1. an in-service and trenchless repair method for disconnection of drainage pipeline, comprising steps of:

S1: putting a pipe sonar, which is connected to a traction rope, into the drainage pipeline from an upstream inspection well, connecting one end of the traction rope to a ground surface of the upstream inspection well, and pulling the other end of the traction rope out from a downstream inspection well;

S2: pulling the traction rope to slowly move the pipe sonar in the drainage pipeline until the disconnection is found, then labeling the traction rope exposed on the ground surface with a mark to conveniently and quickly find the disconnection in subsequent processes;

S3: pulling out the pipe sonar;

S4: according to the mark on the traction rope, replacing the pipe sonar with a hollowed cylindrical airbag matching a pipeline diameter, and pulling the hollowed cylindrical airbag from the upstream inspection well to the disconnection according to the step S1; turning on an air compressor on the ground surface to inflate the hollowed cylindrical airbag through an air pipe, in such a manner that the hollowed cylindrical airbag is inflated and presses a pipeline wall, and sewage continues to flow through a through-hole in a middle of the hollowed cylindrical airbag;

S5: drill a grouting hole on the ground surface corresponding to the disconnection until reaching the disconnection, and inserting a grouting pipe into the grouting hole; connecting the grouting pipe to a grouting system on the ground surface and turning on the grouting system to inject a double-slurry quick-curing repair material to the disconnection, wherein slurry flows and diffuses around a pipe body at the disconnection, rapidly expands and cures, and forms a ring-shaped anti-seepage layer; and S6: after the double-slurry quick-curing repair material is cured, controlling the air compressor on the ground surface to deflate the hollowed cylindrical airbag, and pulling the hollowed cylindrical airbag out with the traction rope, putting the pipe sonar into the drainage pipeline again from the upstream detection well, and moving the pipe sonar by the traction rope for retesting, so as to check repair effectiveness.

Preferably, in the step S1, both the upstream inspection well and the downstream inspection well are installed with respective pulley sets, and the traction rope is sequentially wound on the pulley sets; the pipe sonar is tied in a middle of the traction rope.

Preferably, in the step S1, for pulling the other end of the traction rope out from the downstream inspection well, a floating object is connected to the other end of the traction rope; the floating object moves with a water flow in the drainage pipeline to the downstream inspection well, and then the other end of the traction rope, which is connected to the floating object, is pulled out from the downstream inspection well.

Preferably, in the step S2, the mark is a label where detailed information of the disconnection is recorded.

Preferably, in the step S4, after being inflated, a length of the hollowed cylindrical airbag, is 2 m, an external diameter of the hollowed cylindrical airbag is at least 2 cm larger than an internal diameter of the drainage pipeline being repaired, and an internal diameter of the hollowed cylindrical airbag is at least 5 cm smaller than the external diameter.

Preferably, in the step S4, one end of the hollowed cylindrical airbag, is connected to one end of the air pipe, and an airbag valve is provided on the air pipe; the other end of the air pipe is connected to a gas port of the air compressor.

Preferably, in the step S4, a metal detection rod is arranged in the through-hole in the middle of the hollowed cylindrical airbag, which cooperates with a radar detector on the ground surface to detect a depth between the disconnection and the ground surface.

Preferably, the hollowed cylindrical airbag is made of rubber.

Preferably, in the step S5, the grouting hole is drilled on the ground surface directly above or on two sides of the disconnection; or, grouting holes are drilled on ground surfaces directly above and on both sides of the disconnection, for the slurry to flow and diffuse at the disconnection.

Preferably, in the step S5, the double-slurry quick-curing repair material comprises a main agent and a curing agent with a weight ratio of 1:1-2:1;

the main agent comprises following raw materials in parts by weight, 50-160 parts of isocyanate and 20-100 parts of a chlorophosphate mixture with a density of more than 1400 $kg/m^3$, wherein a weight ratio of the isocyanate and the chlorophosphate mixture is 1:1-4:1;

the curing agent comprises following raw materials in parts by weight, 30-60 parts of the chlorophosphate mixture with the density of more than 1400 $kg/m^3$, 5-15 parts of propyl formate, methyl propionate or a mixture of propyl formate and methyl propionate, 15-55 parts of polyhydric alcohol, 1-3 parts of a surfactant, 2-6 parts of a catalyst, 0-0.5 part of water, and 0-1 part of color paste.

Preferably, in the step S5, the grouting system comprises the air compressor, a first pneumatic diaphragm pump and a second pneumatic diaphragm pump, both are connected to the air compressor through air ropes; the grouting system further comprises a first storage bucket and a second storage bucket, wherein the first storage bucket is connected to the first pneumatic diaphragm pump through a feeding pipe; and the second storage bucket is connected to the second pneumatic diaphragm pump through a feeding pipe; the grouting system further comprises a grouting proportioner, wherein discharge ports of the first and second pneumatic diaphragm pumps are connected to the grouting proportioner through feeding pipes; a discharge port of the grouting proportioner is connected to a grouting head through a feeding pipe, and the grouting head is connected to the grouting pipe. The main agent and the curing agent of the double-slurry quick-curing repair material is stored in the first and second storage buckets, respectively.

Preferably, in the step S6, according to the mark on the traction rope, repaired disconnection is rapidly found for retesting.

It should be noted that when searching for disconnection in a certain section of the drainage pipeline, after all possible disconnections in this section are inspected, they should be marked separately before pulling out the pipe sonar, so as to improve inspection efficiency.

In view of characteristics of the double-slurry quick-curing repair material, it is easy to detach from the hollowed cylindrical airbag made of rubber. After the double-slurry quick-curing repair material is cured at the disconnection, the deflated hollowed cylindrical airbag can be pulled out by gently pulling the traction rope.

With the foregoing technical solutions, beneficial effects of the present invention are as follows.

1. The present invention utilizes the characteristics of the hollowed cylindrical airbag. As an important medium for pipeline repair, external side walls of the inflated hollowed cylindrical airbag are in close contact with the disconnection to prevent grouting slurry from entering the water flow and polluting the water source. At the same time, the water flow can pass normally through the through-hole in the middle of the hollowed cylindrical airbag, so that there is no need to stop the water during the repair process of the pipe disconnection, which greatly reduces adverse consequences caused by water-stop repair for disconnection of urban drainage main pipelines to the entire discharge system.

2. The present invention adopts the pipe sonar to detect the disconnection. Together with the depth detection of the dislocation by the radar depth detector, the pipeline disconnection repair method does not require excavation, and only a grouting hole needs to be drilled at the corresponding position of the disconnection, which greatly reduces difficulty and time of construction, and the adverse consequences of excavation on nearby traffic.

3. The present invention inserts the grouting pipe into the grouting hole and injects the double-slurry quick-curing repair material into the disconnection through the grouting pipe, which is easy to operate. In addition, the double-slurry quick-curing repair material can be cured rapidly, which improves repair efficiency for the disconnection of the drainage pipelines.

BRIEF DESCRIPTION OF THE DRAWINGS

In order to more clearly explain the embodiments of the present invention or the technical solutions in the prior art, the drawings used in the description of the embodiments or the prior art will be briefly introduced below. Obviously, the drawings in the following description are merely some embodiments of the present invention. For those of ordinary skill in the art, other drawings can be obtained based on the drawings without creative labor.

ELEMENT REFERENCE

1—traction rope; 2—pulley unit; 3—upstream inspection well; 4—pipe sonar; 5—disconnection; 6—hollowed cylindrical airbag; 7—airbag valve; grouting pipe; 8—air compressor, 9—grouting hole, 10—grouting pipe, 11—grouting system.

DETAILED DESCRIPTION OF THE PREFERRED EMBODIMENT

Technical solutions according to embodiments of the present invention will be clearly and completely described below with reference to the accompanying drawings. Obviously, the described embodiments are only a part of all embodiments of the present invention. Based on the embodiments of the present invention, all other embodiments can be obtained by those of ordinary skill in the art without creative efforts. Such other embodiments shall fall within the protection scope of the present invention.

The present invention will be further illustrated below with accompanying drawings.

Figure 1:
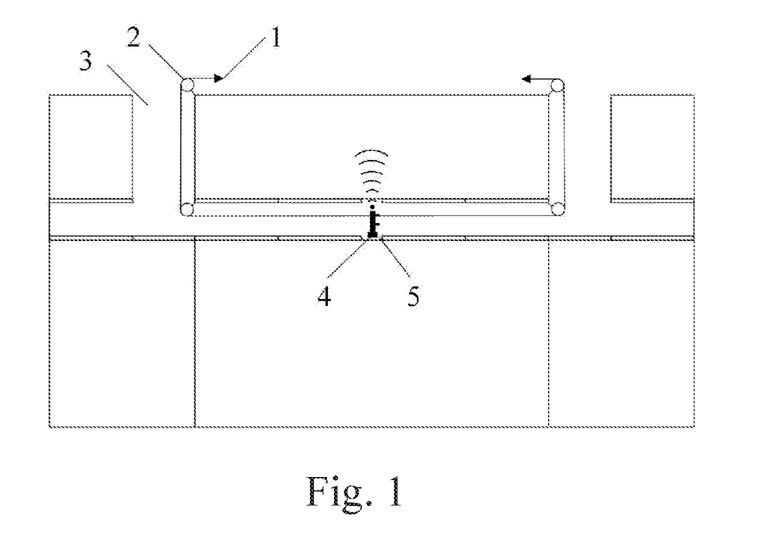
FIG. 1 is a sectional view illustrating pipeline disconnection detection with a pipe sonar.
Figure 2:
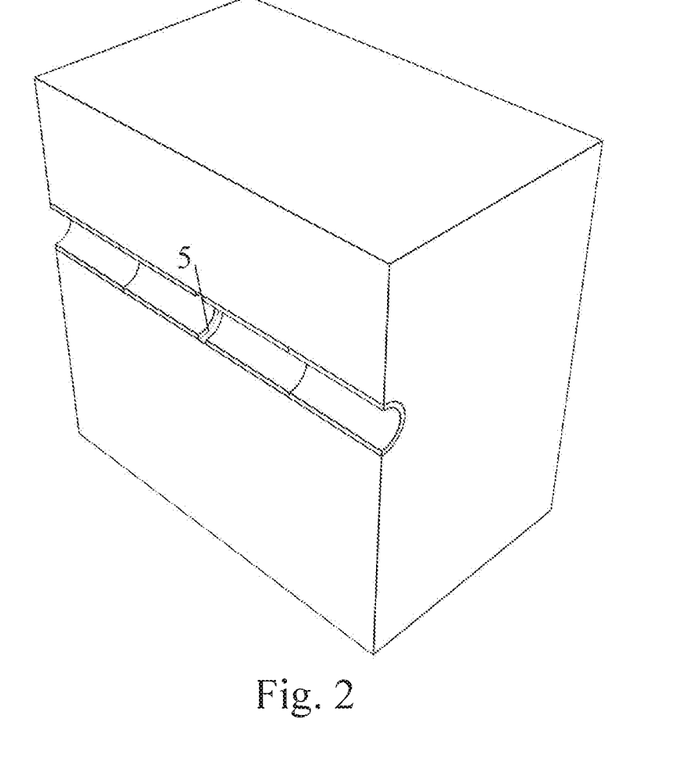
FIG. 2 is a perspective view of pipeline disconnection.
Figure 3:
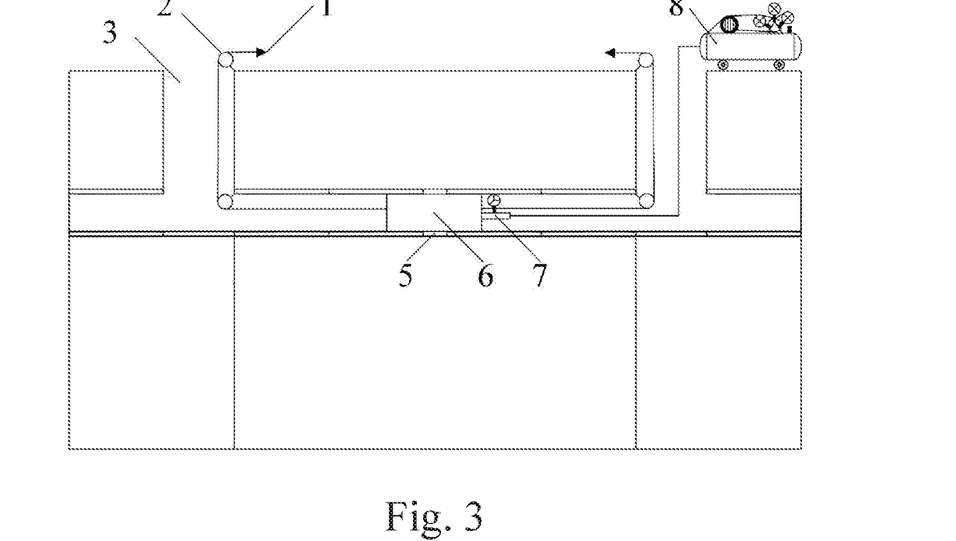
FIG. 3 illustrates plugging with a hollowed cylindrical airbag.
Figure 6:
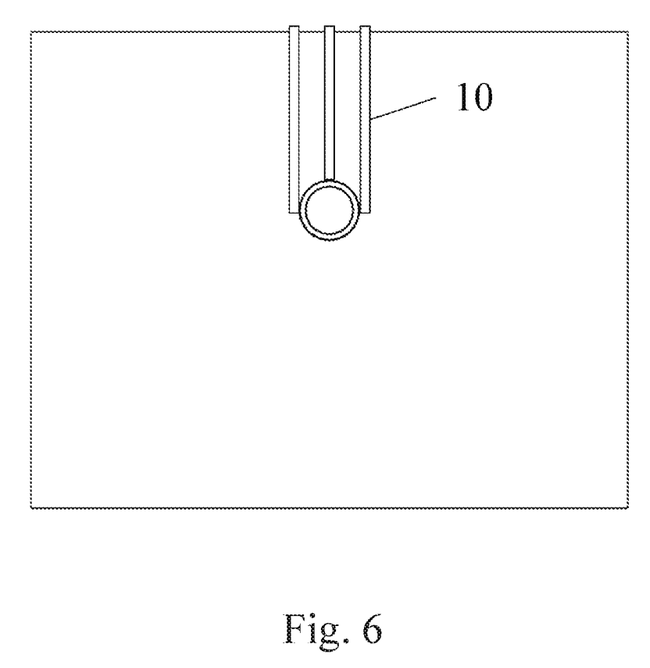
FIG. 6 is a cross-sectional view illustrating arrangement of the grouting holes and grouting pipes.
Figure 7:
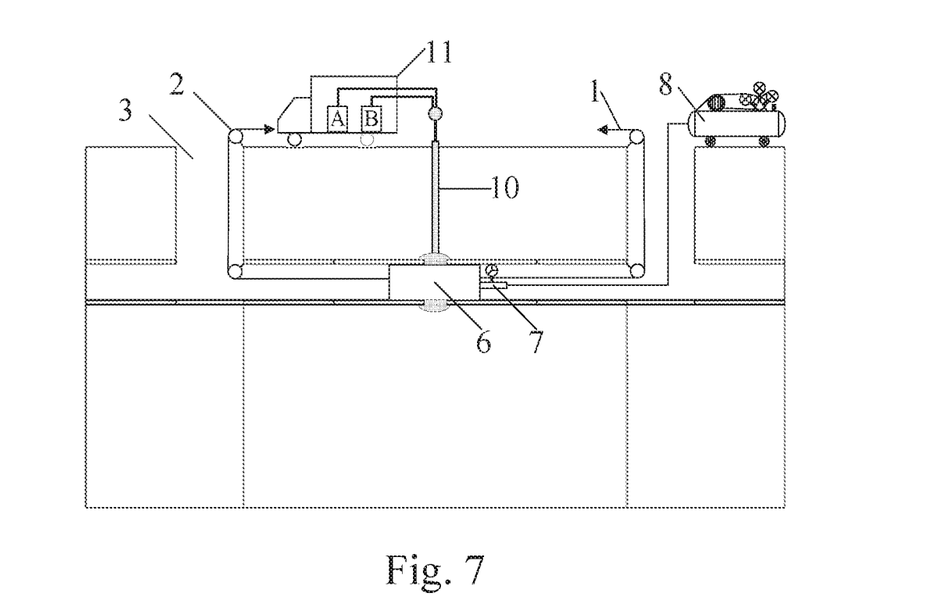
FIG. 7 illustrates external repair of the pipeline disconnection by grouting.

Referring to FIGS. 1, 2, 3, 6 and 7, an embodiment of an in-service and trenchless repair method for disconnection of drainage pipeline is provided, comprising steps of:

S1: putting a pipe sonar 4, which is connected to a traction rope 1, into the drainage pipeline from an upstream inspection well 3, connecting one end of the traction rope 1 to a ground surface of the upstream inspection well 3, and pulling the other end of the traction rope 1 out from a downstream inspection well;

S2: pulling the traction rope 1 to slowly move the pipe sonar 4 in the drainage pipeline until the disconnection 5 is found, then labeling the traction rope 1 exposed on the ground surface with a mark to conveniently and quickly find the disconnection 5 in subsequent processes;

S3: pulling out the pipe sonar 4;

S4: according to the mark on the traction rope 1, replacing the pipe sonar 4 with a hollowed cylindrical airbag 6 matching a pipeline diameter, and pulling the hollowed cylindrical airbag 6 from the upstream inspection well 3 to the disconnection 5 according to the step S1; turning on an air compressor 8 on the ground surface to inflate the hollowed cylindrical airbag 6 through an air pipe, in such a manner that the hollowed cylindrical airbag 6 is inflated and presses a pipeline wall, and sewage continues to flow through a through-hole in a middle of the hollowed cylindrical airbag 6;

S5: drilling a grouting hole 9 on the ground surface corresponding to the disconnection 5 until reaching the disconnection 5, and inserting a grouting pipe 10 into the grouting hole 9; connecting the grouting pipe 10 to a grouting system 11 on the ground surface and turning on the grouting system 11 to inject a double-slurry quick-curing repair material to the disconnection 5, wherein slurry flows and diffuses around a pipe body at the disconnection 5, rapidly expands and cures, and forms a ring-shaped anti-seepage layer; and S6: after the double-slurry quick-curing repair material is cured, controlling the air compressor 8 on the ground surface to deflate the hollowed cylindrical airbag 6, and pulling the hollowed cylindrical airbag 6 out with the traction rope 1, putting the pipe sonar 4 into the drainage pipeline again from the upstream detection well 3, and moving the pipe sonar 4 by the traction rope 1 for retesting, so as to check repair effectiveness.

Preferably, referring to FIGS. 1, 3 and 7, in the step S1, both the upstream inspection well 3 and the downstream inspection well are installed with respective pulley sets 2, and the traction rope 1 is sequentially wound on the pulley sets 2; the pipe sonar 4 is tied in a middle of the traction rope 1, wherein the traction rope 1 is long enough to move the pipe sonar 4 in the drainage pipeline.

Preferably, in the step S1, for pulling the other end of the traction rope 1 out from the downstream inspection well, a floating object is connected to the other end of the traction rope 1; the floating object moves with a water flow in the drainage pipeline to the downstream inspection well, and then the other end of the traction rope 1, which is connected to the floating object, is pulled out from the downstream inspection well.

Preferably, in the step S2, the mark is a label where detailed information of the disconnection is recorded, for example, the first disconnection.

Figure 4:
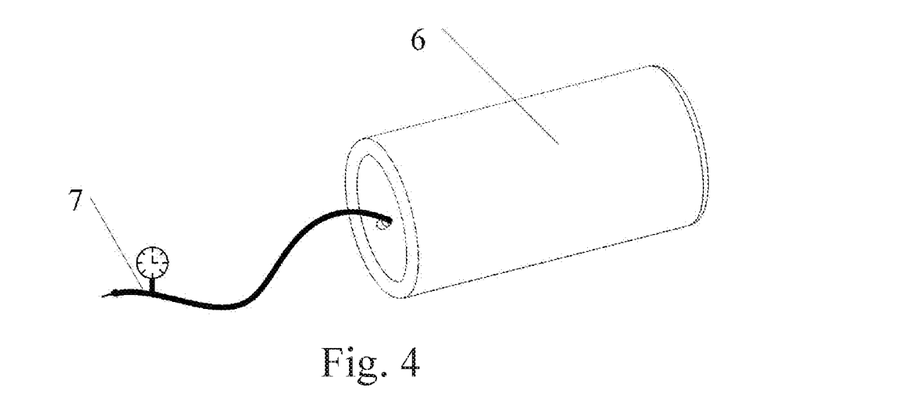
FIG. 4 is a sketch view of the hollowed cylindrical airbag.

Preferably, referring to FIG. 4, in the step S4, after being inflated, a length of the hollowed cylindrical airbag 6 is 2 m, an external diameter of the hollowed cylindrical airbag 6 is at least 2 cm larger than an internal diameter of the drainage pipeline being repaired, and an internal diameter of the hollowed cylindrical airbag 6 is at least 5 cm smaller than the external diameter.

Preferably, referring to FIG. 4, in the step S4, one end of the hollowed cylindrical airbag 6 is connected to one end of the air pipe, and an airbag valve 7 is provided on the air pipe; the other end of the air pipe is connected to a gas port of the air compressor 8. The air compressor 8 can open and close the airbag valve 7, so as to inflate and deflate the hollowed cylindrical airbag 6 from the ground surface.

Preferably, referring to FIG. 4, in the step S4, a metal detection rod is arranged in the through-hole in the middle of the hollowed cylindrical airbag 6, which cooperates with a radar detector on the ground surface to detect a depth between the disconnection 5 and the ground surface.

Preferably, the hollowed cylindrical airbag 6 is made of rubber.

Figure 5:
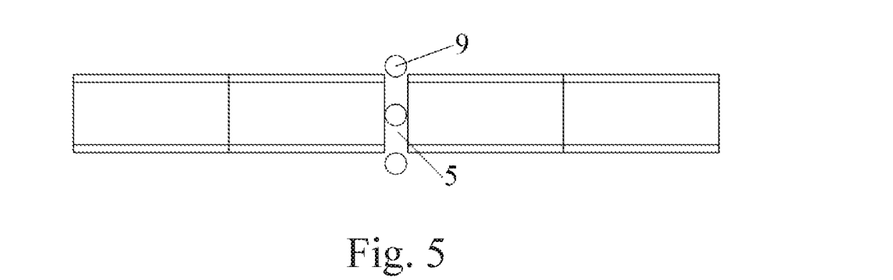
FIG. 5 is a plan layout of grouting holes.
Figure 8:
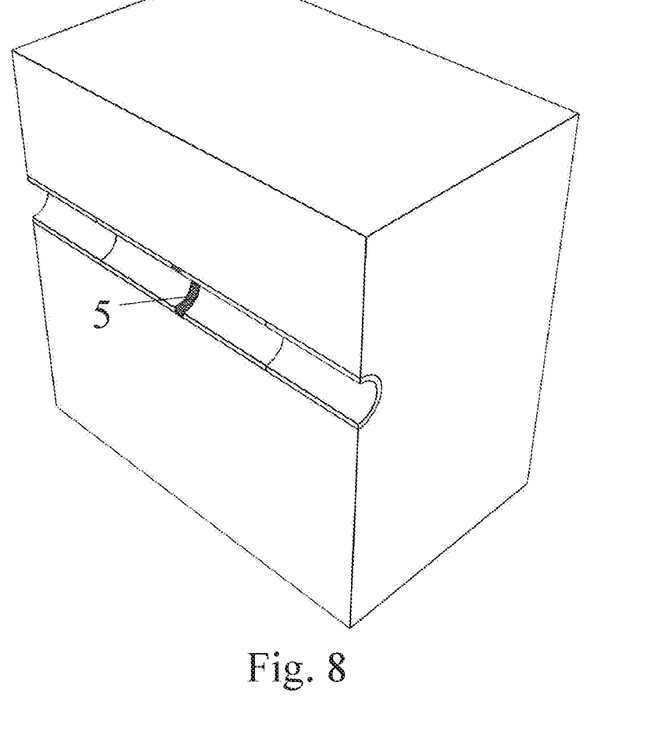
FIG. 8 is a perspective view illustrating the external repair of the pipeline disconnection by grouting.

Preferably, referring to FIGS. 5 and 6, in the step S5, the grouting hole 9 is drilled on the ground surface directly above or on two sides of the disconnection 5; or, grouting holes 9 are drilled on ground surfaces directly above and on both sides of the disconnection 5, for the slurry to flow and diffuse at the disconnection 5. In the embodiment, the grouting holes 9 are drilled on the ground surfaces directly above and on both sides of the disconnection 5. Three grouting holes 9 reach the disconnection 5, and form the ring-shaped anti-seepage layer for the slurry to flow and diffuse around the pipe body at the disconnection 5, as shown in FIGS. 7 and 8.

Preferably, in the step S5, the double-slurry quick-curing repair material comprises a main agent and a curing agent with a weight ratio of 1:1-2:1;

the main agent comprises following raw materials in parts by weight, 50-160 parts of isocyanate and 20-100 parts of a chlorophosphate mixture with a density of more than 1400 kg/m$^3$, wherein a weight ratio of the isocyanate and the chlorophosphate mixture is 1:1-4:1;

the curing agent comprises following raw materials in parts by weight, 30-60 parts of the chlorophosphate mixture with the density of more than 1400 kg/m$^3$, 5-15 parts of propyl formate, methyl propionate or a mixture of propyl formate and methyl propionate, 15-55 parts of polyhydric alcohol, 1-3 parts of a surfactant, 2-6 parts of a catalyst, 0-0.5 part of water, and 0-1 part of color paste.

Preferably, referring to FIG. 7, in the step S5, the grouting system comprises the air compressor, a first pneumatic diaphragm pump and a second pneumatic diaphragm pump, both are connected to the air compressor through air ropes; the grouting system further comprises a first storage bucket and a second storage bucket, wherein the first storage bucket is connected to the first pneumatic diaphragm pump through a feeding pipe; and the second storage bucket is connected to the second pneumatic diaphragm pump through a feeding pipe; the grouting system further comprises a grouting proportioner, wherein discharge ports of the first and second pneumatic diaphragm pumps are connected to the grouting proportioner through feeding pipes; a discharge port of the grouting proportioner is connected to a grouting head through a feeding pipe, and the grouting head is connected to the grouting pipe. The main agent and the curing agent of the double-slurry quick-curing repair material is stored in the first and second storage buckets, respectively.

Preferably, in the step S6, according to the mark on the traction rope 1, repaired disconnection 5 is rapidly found for retesting.

It should be noted that when searching for disconnection 5 in a certain section of the drainage pipeline, after all possible disconnections 5 in this section are inspected, they should be marked separately before pulling out the pipe sonar 4, so as to improve inspection efficiency.

In view of characteristics of the double-slurry quick-curing repair material, it is easy to detach from the hollowed cylindrical airbag 6 made of rubber. After the double-slurry quick-curing repair material is cured at the disconnection 5, the deflated hollowed cylindrical airbag 6 can be pulled out by gently pulling the traction rope.

The in-service and trenchless repair method for the disconnection of the drainage pipeline according to the embodiment uses trenchless repair, which provides low repair cost, high degree of construction automation, low construction intensity, high construction efficiency, construction out of the well, low space occupation, improved safety, no restriction by environmental space, no noise, and no disturbance to the people. Meanwhile, the embodiment utilizes the characteristics of the hollowed cylindrical airbag. As an important medium for pipeline repair, external side walls of the inflated hollowed cylindrical airbag are in close contact with the disconnection to prevent grouting slurry from entering the water flow and polluting the water source. At the same time, the water flow can pass normally through the through-hole in the middle of the hollowed cylindrical airbag, so that there is no need to stop the water during the repair process of the pipe disconnection, which greatly reduces adverse consequences caused by water-stop repair for disconnection of urban drainage main pipelines to the entire discharge system. According to the embodiment, the in-service trenchless repair method for the disconnection comprises steps of: detecting the disconnection by a pipe sonar 4, and making a traction rope 1; pulling a hollowed cylindrical airbag 6 to the disconnection according to the mark on the traction rope 1; controlling an airbag valve 7 by an air compressor on the ground to inflate the hollowed cylindrical airbag, 6, so that the hollowed cylindrical airbag is in close contact with pipeline walls after inflation; drill a grouting hole 9 on the ground surface directly above and on both sides of the disconnection until reaching the disconnection, and inserting a grouting pipe 10 into the grouting hole 9; then injecting a double-slurry quick-curing repair material into the disconnection through a grouting system 11 on the ground and waiting for curing; controlling the airbag valve 7 by the air compressor on the ground to deflate the hollowed cylindrical airbag, 6 and pulling out the hollowed cylindrical airbag 6 by the traction rope. The double-slurry quick-curing repair material is used as a repair material at the disconnection 5. Since the double-slurry quick-curing repair material can rapidly cure, the repair efficiency is improved.

The above is a detailed illustration of the present invention. Specific embodiments have been used herein to explain the principles and implementation of the present invention. The description of the above embodiments is only used to help understand the method and core spirit of the present invention. It should be noted that, for those of ordinary skill in the art, without departing from the principle of the present invention, several improvements and modifications can be made to the present invention, and these improvements and modifications also fall within the claimed protection scope of the present invention.

What is claimed is:

1. An in-service and trenchless repair method for disconnection of drainage pipeline, comprising steps of:
    S1: putting a pipe sonar, which is connected to a traction rope, into the drainage pipeline from an upstream inspection well, connecting one end of the traction rope to a ground surface of the upstream inspection well, and pulling the other end of the traction rope out from a downstream inspection well;
    S2: pulling the traction rope to slowly move the pipe sonar in the drainage pipeline until the disconnection is found, then labeling the traction rope exposed on the ground surface with a mark to conveniently and quickly find the disconnection in subsequent processes;
    S3: pulling out the pipe sonar;
    S4: according to the mark on the traction rope, replacing the pipe sonar with a hollowed cylindrical airbag matching a pipeline diameter, and pulling the hollowed cylindrical airbag from the upstream inspection well to the disconnection according to the step S1; turning on an air compressor on the ground surface to inflate the hollowed cylindrical airbag through an air pipe, in such a manner that the hollowed cylindrical airbag is inflated and presses a pipeline wall, and sewage continues to flow through a through-hole in a middle of the hollowed cylindrical airbag;
    S5: drilling a grouting hole on the ground surface corresponding to the disconnection until reaching the disconnection, and inserting a grouting pipe into the grouting hole; connecting the grouting pipe to a grouting system on the ground surface and turning on the grouting system to inject a double-slurry quick-curing repair material to the disconnection, wherein slurry flows and diffuses around a pipe body at the disconnection, rapidly expands and cures, and forms a ring-shaped anti-seepage layer; and
    S6: after the double-slurry quick-curing repair material is cured, controlling the air compressor on the ground surface to deflate the hollowed cylindrical airbag, and pulling the hollowed cylindrical airbag out with the traction rope, putting the pipe sonar into the drainage pipeline again from the upstream detection well, and moving the pipe sonar by the traction rope for retesting, so as to check repair effectiveness.

2. The in-service and trenchless repair method, as recited in claim 1, wherein in the step S1, both the upstream inspection well and the downstream inspection well are installed with respective pulley sets, and the traction rope is sequentially wound on the pulley sets; the pipe sonar is tied in a middle of the traction rope.

3. The in-service and trenchless repair method, as recited in claim 2, wherein in the step S1, for pulling the other end of the traction rope out from the downstream inspection well, a floating object is connected to the other end of the traction rope; the floating object moves with a water flow in the drainage pipeline to the downstream inspection well, and then the other end of the traction rope, which is connected to the floating object, is pulled out from the downstream inspection well.

4. The in-service and trenchless repair method, as recited in claim 2, wherein in the step S4, a metal detection rod is arranged in the through-hole in the middle of the hollowed cylindrical airbag, which cooperates with a radar detector on the ground surface to detect a depth between the disconnection and the ground surface.

5. The in-service and trenchless repair method, as recited in claim 2, wherein in the step S5, the double-slurry quick-curing repair material comprises a main agent and a curing agent with a weight ratio of 2:1-1:1;
the main agent comprises following raw materials in parts by weight, 50-160 parts of isocyanate and 20-100 parts of a chlorophosphate mixture with a density of more than 1400 kg/m$^3$, wherein a weight ratio of the isocyanate and the chlorophosphate mixture is 1:1-4:1;
the curing agent comprises following raw materials in parts by weight, 30-60 parts of the chlorophosphate mixture with the density of more than 1400 kg/m$^3$, 5-15 parts of propyl formate, methyl propionate or a mixture of propyl formate and methyl propionate, 15-55 parts of polyhydric alcohol, 1-3 parts of a surfactant, 2-6 parts of a catalyst, 0-0.5 part of water, and 0-1 part of color paste.

6. The in-service and trenchless repair method, as recited in claim 1, wherein in the step S1, for pulling the other end of the traction rope out from the downstream inspection well, a floating object is connected to the other end of the traction rope; the floating object moves with a water flow in the drainage pipeline to the downstream inspection well, and then the other end of the traction rope, which is connected to the floating object, is pulled out from the downstream inspection well.

7. The in-service and trenchless repair method, as recited in claim 1, wherein in the step S4, after being inflated, a length of the hollowed cylindrical airbag is 2 m, an external diameter of the hollowed cylindrical airbag is at least 2 cm larger than an internal diameter of the drainage pipeline being repaired, and an internal diameter of the hollowed cylindrical airbag, is at least 5 cm smaller than the external diameter.

8. The in-service and trenchless repair method, as recited in claim 7, wherein in the step S4, a metal detection rod is arranged in the through-hole in the middle of the hollowed cylindrical airbag, which cooperates with a radar detector on the ground surface to detect a depth between the disconnection and the ground surface.

9. The in-service and trenchless repair method, as recited in claim 1, wherein in the step S4, one end of the hollowed cylindrical airbag is connected to one end of the air pipe, and an airbag valve is provided on the air pipe; the other end of the air pipe is connected to the air compressor.

10. The in-service and trenchless repair method, as recited in claim 9, wherein in the step S4, a metal detection rod is arranged in the through-hole in the middle of the hollowed cylindrical airbag, which cooperates with a radar detector on the ground surface to detect a depth between the disconnection and the ground surface.

11. The in-service and trenchless repair method, as recited in claim 1, wherein in the step S4, a metal detection rod is arranged in the through-hole in the middle of the hollowed cylindrical airbag, which cooperates with a radar detector on the ground surface to detect a depth between the disconnection and the ground surface.

12. The in-service and trenchless repair method, as recited in claim 1, wherein in the step S5, the grouting hole is drilled on the ground surface directly above or on two sides of the disconnection; or, grouting holes are drilled on ground surfaces directly above and on both sides of the disconnection.

13. The in-service and trenchless repair method, as recited in claim 12, wherein in the step S5, the double-slurry quick-curing repair material comprises a main agent and a curing agent with a weight ratio of 1:1-2:1;
the main agent comprises following raw materials in parts by weight, 50-160 parts of isocyanate and 20-100 parts of a chlorophosphate mixture with a density of more than 1400 kg/m$^3$, wherein a weight ratio of the isocyanate and the chlorophosphate mixture is 1:1-4:1;
the curing agent comprises following raw materials in parts by weight, 30-60 parts of the chlorophosphate mixture with the density of more than 1400 kg/m$^3$, 5-15 parts of propyl formate, methyl propionate or a mixture of propyl formate and methyl propionate, 15-55 parts of polyhydric alcohol, 1-3 parts of a surfactant, 2-6 parts of a catalyst, 0-0.5 part of water, and 0-1 part of color paste.

14. The in-service and trenchless repair method, as recited in claim 1, wherein in the step S5, the double-slurry quick-curing repair material comprises a main agent and a curing agent with a weight ratio of 2:1-1:1;
the main agent comprises following raw materials in parts by weight, 50-160 parts of isocyanate and 20-100 parts of a chlorophosphate mixture with a density of more than 1400 kg/m$^3$, wherein a weight ratio of the isocyanate and the chlorophosphate mixture is 1:1-4:1;
the curing agent comprises following raw materials in parts by weight, 30-60 parts of the chlorophosphate mixture with the density of more than 1400 kg/m$^3$, 5-15 parts of propyl formate, methyl propionate or a mixture of propyl formate and methyl propionate, 15-55 parts of polyhydric alcohol, 1-3 parts of a surfactant, 2-6 parts of a catalyst, 0-0.5 part of water, and 0-1 part of color paste.

15. The in-service and trenchless repair method, as recited in claim 1, wherein in the step S5, the grouting system comprises a first pneumatic diaphragm pump and a second pneumatic diaphragm pump, both are connected to the air compressor through air ropes; the grouting system further comprises a first storage bucket and a second storage bucket, wherein the first storage bucket is connected to the first pneumatic diaphragm pump through a feeding pipe; and the second storage bucket is connected to the second pneumatic diaphragm pump through a feeding pipe; the grouting system further comprises a grouting proportioner, wherein discharge ports of the first and second pneumatic diaphragm pumps are connected to the grouting proportioner through feeding pipes; a discharge port of the grouting proportioner is connected to a grouting head through a feeding pipe, and the grouting head is connected to the grouting pipe.

16. The in-service and trenchless repair method, as recited in claim 1, wherein in the step S6, according to the mark on the traction rope, repaired disconnection is rapidly found for retesting.

* * * * *